US009083390B2

(12) United States Patent
Tarrab et al.

(10) Patent No.: US 9,083,390 B2
(45) Date of Patent: Jul. 14, 2015

(54) METHOD AND APPARATUS FOR MIXED-MODE SPECTRUM COMMUNICATION

(75) Inventors: Moshe Tarrab, Yahud (IL); Ramon A. Gomez, San Jose, CA (US); Avi Kliger, Ramat Gan (IL); Young Joon Shin, Irvine, CA (US); Dongsoo Daniel Koh, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 366 days.

(21) Appl. No.: 13/448,097

(22) Filed: Apr. 16, 2012

(65) Prior Publication Data

US 2013/0272312 A1 Oct. 17, 2013

(51) Int. Cl.
H04L 12/54 (2013.01)
H04B 1/00 (2006.01)
H04B 1/30 (2006.01)
H04B 1/401 (2015.01)
H04B 1/48 (2006.01)

(52) U.S. Cl.
CPC ............... *H04B 1/0028* (2013.01); *H04B 1/30* (2013.01); *H04B 1/401* (2013.01); *H04B 1/48* (2013.01)

(58) Field of Classification Search
CPC ....................................................... H04L 29/06
USPC .......................................... 370/419, 420, 421
See application file for complete search history.

(56) References Cited

U.S. PATENT DOCUMENTS

| 5,838,204 | A | * | 11/1998 | Yao ............................... 331/1 R |
| 5,847,617 | A | * | 12/1998 | Reddy et al. ..................... 331/57 |
| 6,125,268 | A | * | 9/2000 | Boesch et al. ............. 455/168.1 |
| 6,744,324 | B1 | * | 6/2004 | Adams et al. ................... 331/17 |
| 2002/0177423 | A1 | * | 11/2002 | Cowley ......................... 455/259 |
| 2003/0017817 | A1 | * | 1/2003 | Cowley ......................... 455/323 |
| 2004/0164812 | A1 | * | 8/2004 | Lindstrom et al. ............. 331/46 |
| 2005/0118970 | A1 | * | 6/2005 | Nara .......................... 455/226.1 |
| 2006/0030277 | A1 | * | 2/2006 | Cyr et al. ........................ 455/77 |
| 2006/0164174 | A1 | * | 7/2006 | Molina et al. ................... 331/16 |
| 2008/0051053 | A1 | * | 2/2008 | Fedan ........................... 455/296 |
| 2008/0225168 | A1 | * | 9/2008 | Ouslis et al. .................. 348/554 |
| 2008/0248765 | A1 | * | 10/2008 | Gater ............................ 455/101 |
| 2010/0208717 | A1 | * | 8/2010 | Kim et al. ..................... 370/342 |
| 2011/0002689 | A1 | * | 1/2011 | Sano et al. ...................... 398/44 |
| 2011/0212692 | A1 | * | 9/2011 | Hahn et al. .................... 455/63.1 |

* cited by examiner

*Primary Examiner* — Brandon Renner
*Assistant Examiner* — Abdelnabi Musa
(74) *Attorney, Agent, or Firm* — Brinks Gilson & Lione

(57) ABSTRACT

A local oscillator circuit and a corresponding method are provided. The local oscillator circuit includes a memory connected to a processor. The memory is configured to store local oscillator parameters corresponding to a plurality of center frequencies of a frequency spectrum. The processor is configured to apply the stored LO parameters when switching the frequency spectrum for a mixed-mode spectrum communication. The local oscillator also includes a plurality of registers connected with the processor, the plurality of registers configured to control switching of the frequency spectrum.

20 Claims, 4 Drawing Sheets

US 9,083,390 B2

METHOD AND APPARATUS FOR MIXED-MODE SPECTRUM COMMUNICATION

TECHNICAL FIELD

This disclosure relates generally to communication systems and methods. More particularly, it relates to the mixed-mode spectrum communication by local oscillator (LO) switching.

BACKGROUND

Multimedia over Coax Alliance (MoCA) is a trade group promoting a standard that uses coaxial cables to connect consumer electronics and home networking devices in homes. It allows both data communication and the transfer of audio and video streams between different devices.

In 2007, Entropic Communications announced and released the first availability of a MoCA 1.1 enabled chipset. Features of the MoCA 1.1 standard include net data throughput of up to 175 Mbit/s and support for up to 16 devices. In 2010, MoCA 2.0 was ratified. MoCA 2.0 provides operators and OEMs with a technology roadmap of continued high performance and reliability for multi-room digital video recorder (DVR), personal content sharing, over the top (OTT) content sharing and Internet Protocol television (IPTV) applications. MoCA 2.0 offers two new performance modes with net or actual throughputs of 400 Mbps and 800 Mbps, respectively, each with a corresponding turbo mode. Likewise, two new lower power modes increase energy savings. Expanded operating frequency better accommodates all pay TV service providers. Like MoCA 1.1, MoCA 2.0 is backward compatible with MoCA 1.0 to ensure preservation of operator investment in current equipment.

BRIEF DESCRIPTION OF THE DRAWINGS

The system may be better understood with reference to the following drawings and description. In the figures, like reference numerals designate corresponding parts throughout the different views.

DETAILED DESCRIPTION

The description below relates to a circuit and a corresponding method and system. The circuit includes a memory configured to store LO parameters corresponding to a plurality of center frequencies of a frequency spectrum. The circuit includes a processor connected with the memory, the processor configured to apply the stored LO parameters when switching the frequency spectrum for a mixed-mode spectrum communication. The circuit further includes a plurality of registers connected with the processor, the plurality of registers configured to control switching of the frequency spectrum.

Figure 1:
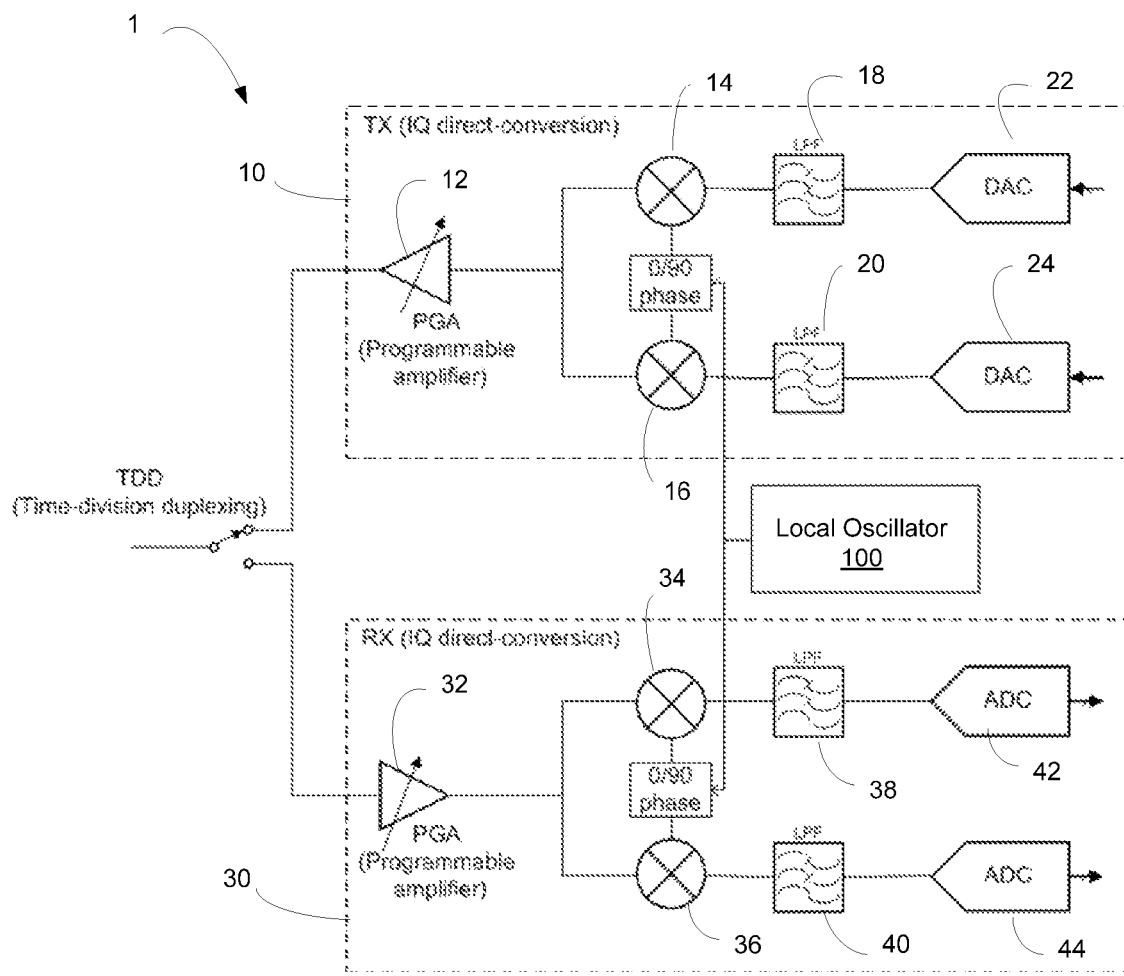
FIG. 1 is a block diagram of an exemplary communication system including a local oscillator (LO).

FIG. 1 is a block diagram of an exemplary communication system 1 that includes a transmitter 10 and a receiver 30. The transmitter 10 and the receiver 30 are both connected to a time division duplex (TDD) communication channel. TDD is an application of time-division multiplexing to separate outward signals from the transmitter 10 and return signals from the receiver 30. Examples of Time Division Duplexing systems include time division Code division multiple access TD-CDMA system and Worldwide Interoperability for Microwave Access (WiMAX) system.

In the communication system 1, the transmitter 10 and the receiver 30 are both connected to a LO that provides a center frequency. The transmitter 10 uses the center frequency for modulation and the receiver 30 uses the center frequency for demodulation. The transmitter 10 includes a plurality of digital-to-analog converters (DACs) 22 and 24. The DACs 22 and 24 convert digital codes to analog signals. The analog signals are then sent to low pass filters (LPFs) 18 and 20, respectively. The LPFs output filtered analog signal to the frequency mixers 14 and 16. The mixer 14 creates new frequencies from two signals: 0° phased center frequency and the filter analog signal from the LPF 18. The mixer 16 creates new frequencies from two signals: 90° phased center frequency and the filter analog signal from the LPF 20. The mixers 14 and 16 then output the modulated analog signals to an amplifier 12.

Similarly, the receiver 30 includes an amplifier 32 that is configured to amplify received analog signal from the TDD channel. The amplified signal is then output to the mixers 34 and 36. The mixers 34 and 36 use the center frequency provided by the LO to demodulate the analog signals. The demodulated signals are then sent to LPFs 38 and 40 which output the filtered signal to a plurality of analog-to-digital converters (ADCs) 42 and 44. The ADCs 42 and 44 convert analog signals to digital codes. For example, the digital codes may be video codes, audio codes, or any other codes for entertainment.

In an embodiment, either the amplifier 12 or the amplifier 32 is a programmable amplifier (PGA). However, all electronic components in the illustrated embodiment may be replaced by similar components having similar functions according to the specific application requirement or other considerations.

For a mixed mode mixed-mode spectrum communication system such as in MoCA 2.0. The LO 100 needs to provide a plurality of different center frequencies to the transmitter 10 and the receiver 30. The number of center frequencies may vary depending on the frequency bandwidth of the latest standard and the frequency bandwidth of the previous standards. For example, in MoCA 2.0, the frequency bandwidth is 100 MHz. When working with MoCA 1.1 devices, the MoCA 2.0 device needs to switch 100 MHz spectrum to 50 MHz spectrum and it may have three different center frequencies at Fc−25 MHz, Fc, and Fc+25 MHz. The spectrum switching needs to be done within the interframe gap. MoCA specifies a normal interframe gap of 10 uSec between MoCA 1.1 and MoCA 2.0 transmissions. However taking into account propagation delays over the Coax, clock accuracies and implementation latencies, the switching time is less than 5 μs.

Conventionally, the MoCA 2.0 device may implement digital modulation such a way that only the part of spectrum is transmitted or received while maintaining same wide bandwidth. However, a same bandwidth require stringent LO feedthrough to meet MoCA spectrum mask of 50 MHz. Further, a 100 MHz bandwidth burns excessive power when working in 50 MHz mode.

Figure 2:
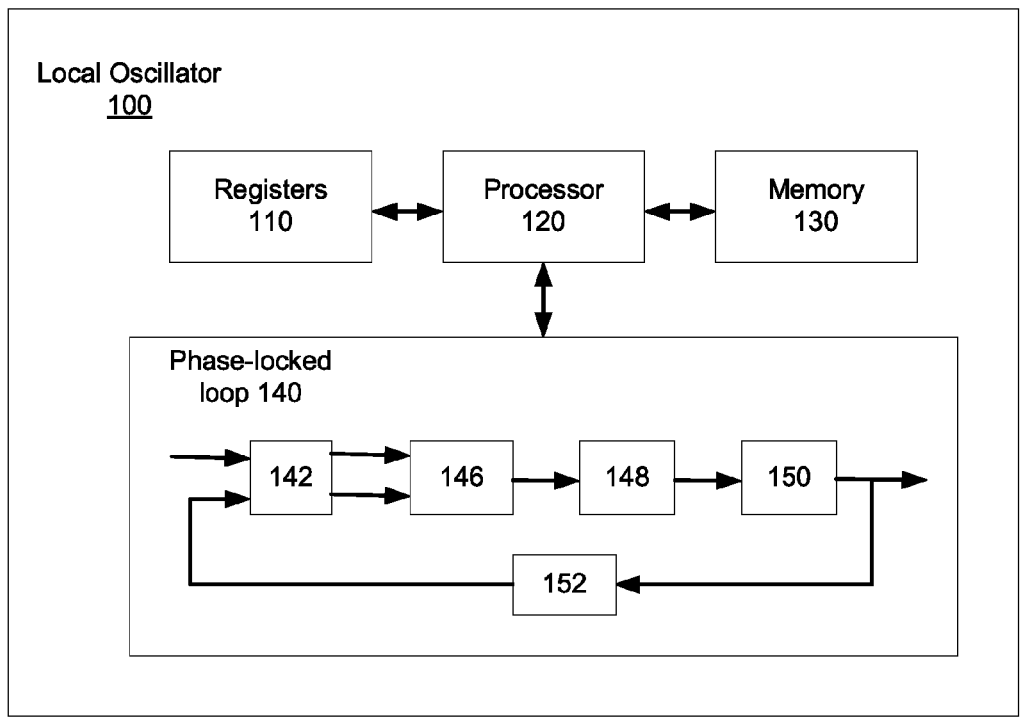
FIG. 2 is a block diagram of an exemplary LO in a communication system.

This disclosure provides a LO 100 that switches spectrum promptly with very little additional hardware. FIG. 2 is a block diagram of an exemplary embodiment of the LO 100 in a communication system.

The LO includes a processor 120 connected to a plurality of registers 110 and a memory 130. The LO is also connected to a phase-locked loop 140. The memory 130 is configured to store local oscillator (LO) parameters corresponding to a plurality of center frequencies of a frequency spectrum. The processor 120 is configured to apply the stored LO parameters when switching the frequency spectrum for a mixed-mode spectrum communication. For example, the plurality of center frequencies may include Fc−25 MHz, Fc, and Fc+25 MHz in the mixed spectrum of a MoCA 1.1 device. The memory 130 may be an on-chip memory so that no additional memory is required. The plurality of registers are configured to control switching of the frequency spectrum corresponding to the different center frequencies.

The plurality of registers may include registers that control the LO switching time. These registers allow data from the registers to be readily applied to the LO synchronously to an internal clock within the interframe gap. The registers may also control whether the device is capable of a continuous preset length linear burst read operation. The burst read operation allows system to fetch mass word data faster than a word read operation.

The stored LO parameters may be determined by a LO tuning algorithm corresponding to a plurality of ambient conditions such as temperatures. The LO tuning algorithm ensures that the resulted LO parameters are valid across the entire ambient temperature range of a particular product. In one embodiment, the parameters may be selected based on a sensor that senses the ambient temperature or other conditions. In other embodiments, the parameters may converge over time and across temperature and thus the parameters can be selected without considering the ambient temperature.

The LO 100 also includes a phase lock loop (PLL) 140. The PLL 140 may be any PLL in the art that generates an output signal whose phase is related to the phase of an input "reference" signal. For example, the PLL 140 may include a phase frequency detector 142 connected to a charge-pump 146 that is configured to convert a phase error to a charge. The charge-pump 146 may include a plurality of transistors and on-chip capacitors. The frequency phase detector 142 compares two input signals $S_{in}$ and $S_{Ref}$ and produces an error signal $E_1$ which is proportional to their phase difference and an unwanted signal $U_1$ having a relatively high frequency. The error signal $E_1$ and the unwanted signal $U_1$ are sent to a low pass filter 148. The low pass filter 148 removes the unwanted signal $U_1$ and output the error signal $E_1$ to drive a Voltage-controlled oscillator (VCO) 150 which creates an output signal $S_{out}$. The output signal $S_{out}$ may be fed through a divider 152 back to obtain the input signal $S_{Ref}$ of the system, producing a negative feedback loop. If the phase of output signal $S_{out}$ drifts, the error signal $E_1$ will increase, driving the VCO 150 phase in the opposite direction so as to reduce the error. Thus the phase of the output signal $S_{out}$ is locked to the phase at the other input signal $S_{in}$. The PLL 140 may be implemented differently and have additional components in different applications.

The PLL may have a plurality of performance parameters controlled by the plurality of registers 110. For example, the performance parameters may include a lock range, a capture, and a PLL loop bandwidth. The lock range defines the frequency range in which the PLL is able to stay locked. The capture range refers to the frequency range the PLL is able to lock-in starting from unlocked condition, which is usually smaller than the lock range. The PLL loop bandwidth defines the speed of the control loop.

In one embodiment, the plurality of registers 110 may include a charge-pump option and a loop bandwidth option. The processor 120 is configured to turn on the charge-pump 146 when the charge-pump option is set to 1 and turn off the charge-pump 146 when the charge-pump option is set to 0. The processor 120 is further configured to set the PLL bandwidth to a wideband when the loop bandwidth option is set to 1 and set the PLL bandwidth to a narrowband when the loop bandwidth option is set to 0.

Figure 3:
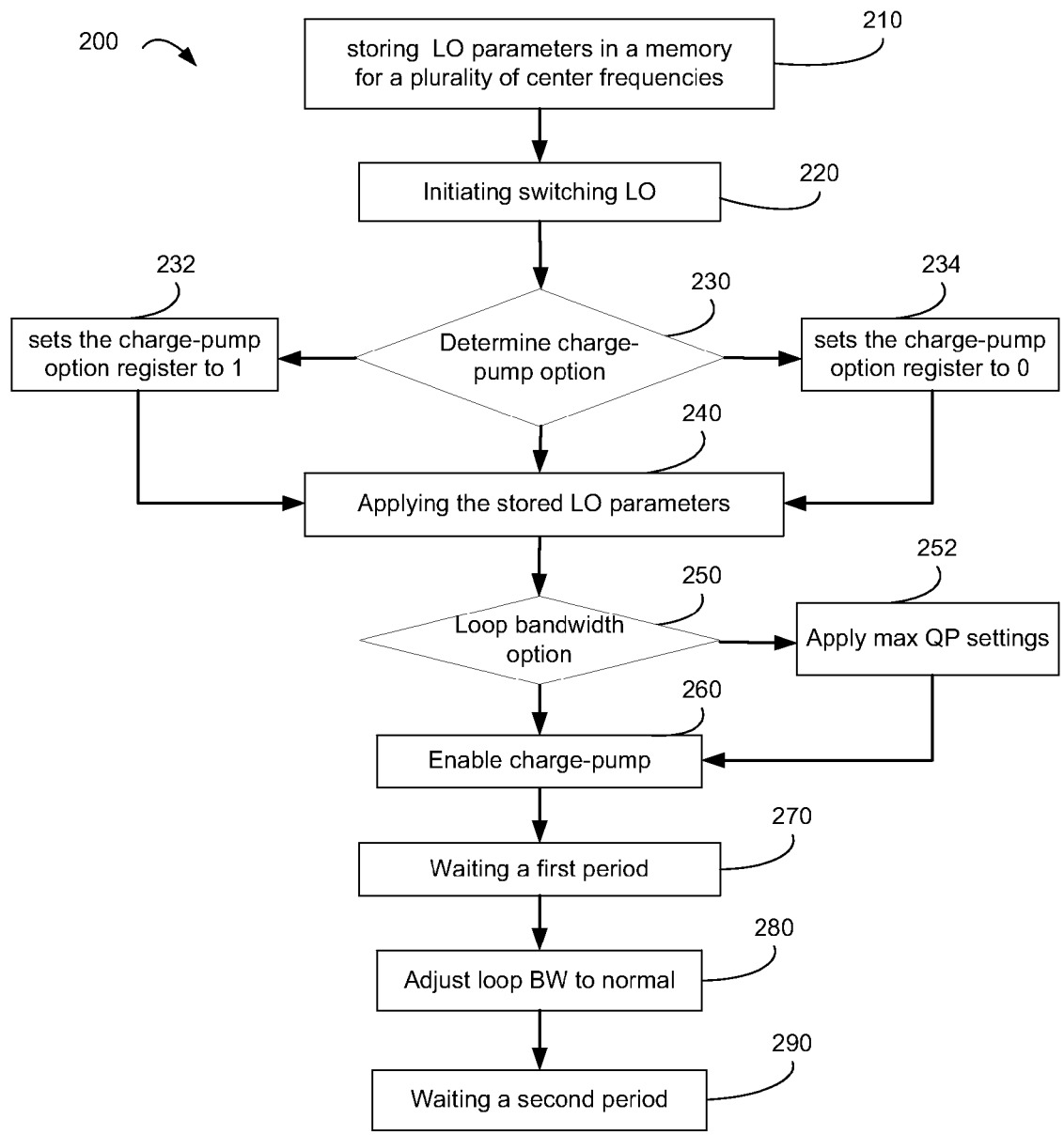
FIG. 3 is a flow chart of an exemplary method for LO switching.

FIG. 3 is a flow chart of an exemplary embodiment of a method 200 for LO switching. This method 200 may be implemented in a system on chip (SoC or SOC) integrated circuit in a MoCA 2.0 device. In block 210, the SoC find and store a plurality of LO parameters at an initialization time for a plurality of frequencies. For example, the plurality of frequencies includes Fc−25 MHz, Fc, and Fc+25 MHz in the mixed spectrum communication between a MoCA 2.0 device and a MoCA 1.1 device.

In block 220, the SoC initiates switching LO when a MoCA 1.1 device send a communication request. For example, when a MoCA 1.1 device send a request to a MoCA 2.0 device to establish a communication between the two devices. The MoCA 2.0 device may need to switch LO shared by its transmitter and receiver.

In block 230, the SoC determines whether the charge-pump option is ON or OFF. If the charge-pump option is ON, the SoC sets the corresponding register to 1 in block 232, otherwise, the SoC sets the register to 0 in block 234. Charge-pump option OFF is chosen in order to hold the voltage that controls the voltage controlled oscillator (VCO) during the LO switching routine. In block 240, the SoC applies the stored LO parameters from the LO memory to the PLL.

In block 250, the SoC determines whether the loop bandwidth option is set to wideband or normal. If the loop bandwidth option is set to wideband, the SoC apply the max QP settings and the loop bandwidth is set to 1 MHz in block 252. With a wideband loop bandwidth, the PLL can achieve a 1 us settling time. However, a wideband loop bandwidth may also introduce undesired jitter and needs to be used for fast LO switching only.

In block 260, the charge-pump is enabled by setting the corresponding charge-pump register to 1. The enabled charge-pump establishes the PLL loop back to normal.

In block 270, the SoC waits a first short period according to a first programmable register so that the PLL stabilizes. The first short period may last about 1 micro second if the loop bandwidth option is set to wideband and about 4 micro seconds if the loop bandwidth option is set to narrow band. In block 280, the SoC adjusts the loop bandwidth to normal which is in the range of 1 MHz to 0.25 MHz. A relatively narrow loop bandwidth of 0.25 MHz is normally chosen to further stabilize the locked phase of the PLL. In block 290, the SoC waits a second short period according to a second programmable register so that the PLL stabilizes. The second period may be longer than the first period. Preferably, the second period is in the range of about 3 to 5 microseconds. More preferably, the second period is around 4 microseconds in one embodiment.

Figure 4:
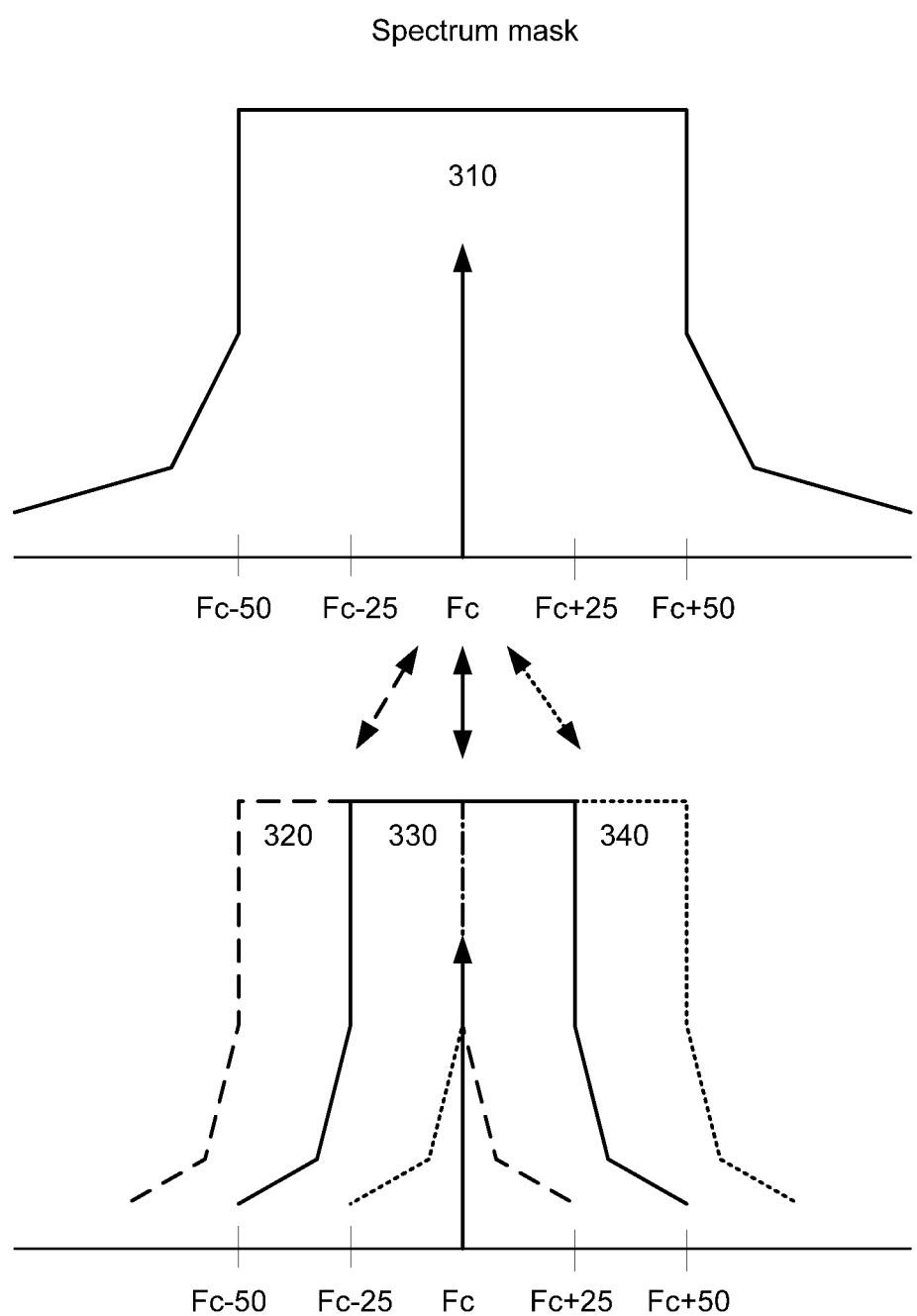
FIG. 4 is a diagram of an exemplary illustration of different spectrum masks of MoCA 2.0 and MoCA 1.1.

FIG. 4 is a diagram of an exemplary illustration of different spectrum masks of MoCA 2.0 and MoCA 1.1. The spectrum masks have different bandwidths. For example, the spectrum mask 310 under MoCA 2.0 has a bandwidth of 100 MHz. The spectrum masks 320, 330, and 340 under MoCA 1.1 have a bandwidth of 50 MHz. When switching from MoCA 2.0 and MoCA 1.1, the communication system needs to switch LO corresponding to the center frequency of the spectrum masks 320, 330, and 340 under MoCA 1.1. In this example, the spectrum mask 320 has a center frequency at Fc−25 MHz. The spectrum mask 330 has a center frequency at Fc MHz and the spectrum mask 340 has a center frequency at Fc+25 MHz. The switching spectrum needs to be accomplished within less than about 5 microseconds in order to comply with the MoCA interframe gap requirements and taking into account propagation delays over the Coax.

In an embodiment, MoCA 2.0 and MoCA 1.1 operate at different frequency bandwidth as illustrated in FIG. 4. In a baseline mode, the bandwidth of a single channel in MoCA 2.0 is 100 MHz while the bandwidth of a single channel in MoCA 1.1 is 50 MHz. The backward compatibility of MoCA 2.0 requires a mixed-mode spectrum operation because the 50 MHz spectrum of MoCA 1.1 can be anywhere between Fc−50 MHz to Fc, Fc−25 MHz to Fc+25 MHz, or Fc to Fc+50 MHz.

The disclosed method switches LO always at the center of the MoCA 1.1 spectrum. However, this method can be extended to other applications with similar variable bandwidth packet-based communication systems.

The proposed method needs very little additional hardware compared to conventional digital modulation scheme. The communication system has an transmitting in-band noise floor of −39 dBc. The power consumption is also decreased more than 30%.

The methods, devices, and logic described above may be implemented in many different ways in many different combinations of hardware, software or both hardware and software. For example, all or parts of the communication system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the communication system described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the communication system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. A circuit, comprising:
   a memory configured to store local oscillator (LO) parameters corresponding to achieving different center frequencies of a frequency spectrum under different ambient conditions of the circuit;
   a processor in communication with the memory, the processor configured to retrieve selected LO parameters from the memory and apply the selected LO parameters when switching the frequency spectrum for a mixed-mode spectrum communication; and
   a register in communication with the processor, the register configured to control the switching of the frequency spectrum between different transmission modes, where the register is configured to apply the selected LO parameters to the LO synchronously with an internal clock within an interframe gap, and
   a phase lock loop (PLL) connected with the LO and configured to generate multiple different center frequencies of the frequency spectrum according to the LO parameters, where the LO parameters are applicable across a predetermined ambient temperature range over which the circuit operates.

2. The circuit of claim 1, wherein the register is configured to apply the selected LO parameters to cause switching between different versions of a Multimedia over Coax Alliance (MoCA) standard within an interframe gap.

3. The circuit of claim 1, wherein the LO parameters comprise LO tuning algorithm determined parameters corresponding to multiple different ambient temperatures.

4. The circuit of claim 1, wherein the memory comprises an on-chip memory configured to store the LO parameters.

5. The circuit of claim 1,
   wherein the phase lock loop (PLL) includes a phase frequency detector connected to a charge-pump; and
   wherein the register comprises a charge-pump option and a loop bandwidth option that respectively control the charge pump and a bandwidth of the PLL.

6. The circuit of claim 5, wherein the charge-pump is configured to convert a phase error to a charge.

7. The circuit of claim 6, wherein the processor is configured to turn on the charge-pump when the charge-pump option is set to a first charge-pump value and turn off the charge-pump when the charge-pump option is set to a second charge-pump value.

8. The circuit of claim 7, wherein the processor is configured to set the PLL bandwidth to a wideband when the loop bandwidth option is set to a first bandwidth value and set the PLL bandwidth to a narrowband when the loop bandwidth option is set to a second bandwidth value.

9. A method comprising:
   storing local oscillator (LO) parameters in a memory, the LO parameters corresponding to implementing multiple different center frequencies under different ambient conditions;
   retrieving selected LO parameters from the memory and applying the selected LO parameters to a LO when switching the LO between different communication standards according to a mixed-mode spectrum;
   controlling switching of the LO with a register, where the register is configured to apply the selected LO parameters to the LO synchronously with an internal clock within an interframe gap, and generating, by a phase lock loop (PLL) connected with the LO, the multiple different center frequencies of a frequency spectrum according to the LO parameters, where the LO parameters are applicable across a predetermined ambient temperature range over which the LO operates.

10. The method of claim 9, wherein the register is configured to switch the LO between communication standards within the interframe gap; and wherein the memory comprises an on-chip memory.

11. The method of claim 9, further comprising determining the LO parameters using LO tuning algorithm corresponding to a plurality of ambient temperatures.

12. The method of claim 9, wherein the PLL comprises a charge-pump configured to convert a phase error to a charge.

13. The method of claim 12, wherein the register comprises a charge-pump option and a PLL loop bandwidth option that respectively control the charge pump and a bandwidth of the PLL.

14. The method of claim 13, further comprising turning on the charge-pump when the charge-pump option is set to a first charge-pump value and turning off the charge-pump when the charge-pump option is set to a second charge-pump value.

15. The method of claim 13, further comprising setting the PLL bandwidth to a wideband when the loop bandwidth option is set to a first bandwidth value and setting the PLL bandwidth to a narrowband when the loop bandwidth option is set to a second bandwidth value.

16. The method of claim 13, further comprising waiting a pre-determined period of time after applying the stored LO parameters to the LO before the PLL stabilizes.

17. A communication system, comprising:
a transmitter and a receiver connected to a local oscillator (LO);
a memory configured to store LO parameters for achieving multiple different center frequencies of a frequency spectrum under different ambient conditions;
a processor in communication with the memory and configured to retrieve selected LO parameters from the memory and apply the selected LO parameters when switching LO based on a mixed-mode spectrum between different communication standards;
a register in communication with the processor and configured to control switching of the frequency spectrum between different transmission modes by applying LO parameters to the LO synchronously with an internal clock within an interframe gap; and
a phase lock loop (PLL) connected with the LO and configured to generate the multiple different center frequencies of the frequency spectrum according to the LO parameters, where the LO parameters are applicable across a predetermined ambient temperature range over which the LO operates.

18. The system of claim 17, wherein the register is configured to switch the LO between different versions of Multimedia over Coax Alliance (MoCA) within the interframe gap defined between the different versions of MoCA; the memory comprises an on-chip memory; and wherein the processor is configured to store the LO parameters in the on-chip memory during an initialization time.

19. The system of claim 17, wherein the register comprises a charge-pump option and a PLL loop bandwidth option.

20. The system of claim 19, wherein:
the PLL comprises a charge-pump;
the processor is configured to turn on the charge-pump when the charge-pump option is set to a first charge-pump value and turn off the charge-pump when the charge-pump option is set to a second charge-pump value; and
the processor is configured to set the PLL bandwidth to a wideband when the loop bandwidth option is set to a first bandwidth value and set the PLL bandwidth to a narrowband when the loop bandwidth option is set to a second bandwidth value.

* * * * *